P. F. SINDELAR.
SOLDERING DEVICE FOR CABLES.
APPLICATION FILED SEPT. 16, 1915.
1,242,610.
Patented Oct. 9, 1917.
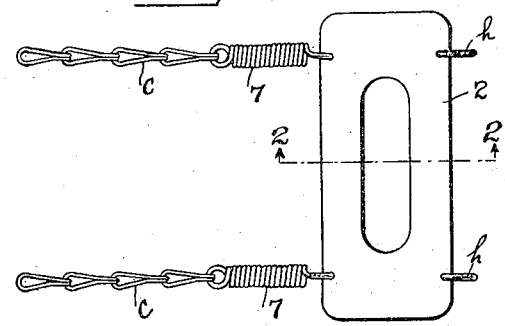
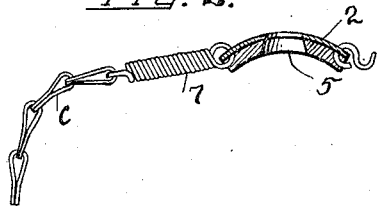
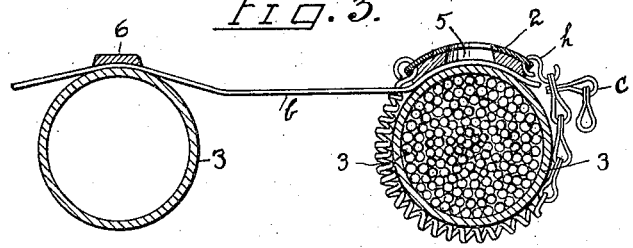
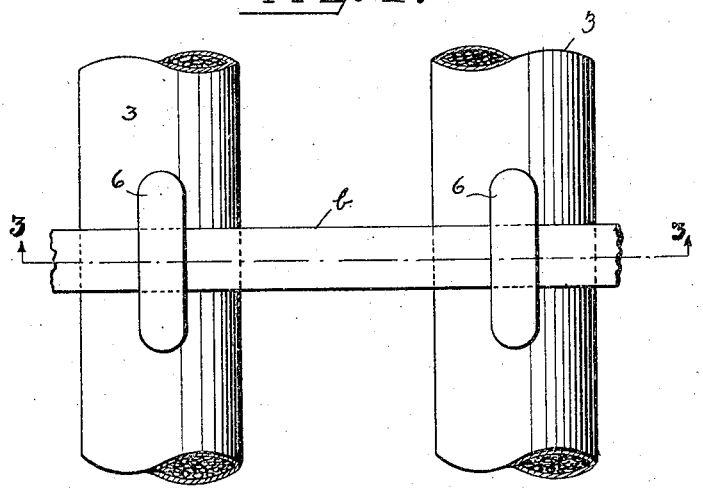
WITNESSES:
Geo. E. Kricker.
INVENTOR.
P. F. SINDELAR.
BY Fisher & Moser
ATTORNEYS.

UNITED STATES PATENT OFFICE.

PETER F. SINDELAR, OF CLEVELAND, OHIO.

SOLDERING DEVICE FOR CABLES.

1,242,610.      Specification of Letters Patent.      Patented Oct. 9, 1917.

Application filed September 16, 1915. Serial No. 50,975.

*To all whom it may concern:*

Be it known that I, PETER F. SINDELAR, a citizen of the United States, residing at Cleveland, in the county of Cuyahoga and State of Ohio, have invented certain new and useful Improvements in Soldering Devices for Cables, of which the following is a specification.

My invention has reference to means for bonding telephone and other electrical cables, all substantially as shown and described and particularly pointed out in the claims.

In the accompanying drawings, Figure 1 is a plan view of the soldering device or article containing the present invention, and Fig. 2 is a cross section thereof on line 2—2, Fig. 1. Fig. 3 is a cross section of two sheathed cables and a bond connecting the same and showing the soldering device about one of the lead sheaths and sectioned as in Fig. 2 and the bond soldered to the other sheath. Fig. 4 is a plan view of said cables with the bond affixed thereto by my improved means.

I am, of course, aware that it is not new to bond electrical cables with a conducting medium to prevent electrolysis, nor is it new to solder the bond to such cables or sheaths containing the cables proper, but so far as I know and believe, it is new to employ such a soldering medium as is shown and described herein for this or any other purpose.

The said soldering medium or device is disclosed in Figs. 1, 2 and 3, and the character of its work particularly in Fig. 4. In this kind of work it is desirable to have means by which the fastening of the bond to the sheaths may be expeditiously done with the minimum of labor and solder and perfect and uniform connections are produced. To these ends I employ a soldering medium comprising a flexible plate 2 which has greater length than width in this instance, and is curved transversely to conform more or less to the transverse curvature with the sheath 3 to which it is designed to be clamped and the said plate has a lining of any suitable flexible material 5 secured to its inner surface to make a close seat upon said sheath and bond $b$ and prevent waste or leakage of the solder about the solder receiving opening 4 in said device.

The said opening has the form of an oblong slot in the middle lengthwise of the device and which affords a well or dam for the solder, the plate and base lining being thick or deep enough to receive the requisite quantity of solder to bind the bond $b$ to the sheath 3.

It will be seen that the said slot or opening about one half to two thirds longer than the width of the bond, so that the solder will flow laterally across the edges of the bond a sufficient distance to make an effectual seal upon the sheath, and it is of larger area at its bottom than at its top to give such taper to the solder or seal 6 that the device can be easily removed therefrom. By this shape and size of opening all the deposits or seals 6 of solder are made uniform as to size and quantity of solder used and in effectiveness and there are no delinquent or defective connections and a minimum of solder can be employed for this purpose.

The said device is secured or fixed temporarily upon a pipe or cable for soldering purposes by means of flexible and elastic strands consisting each of a chain $c$ and springs 7 attached to one side thereof near its ends, and hooks $h$ on the other side adapted to engage in the links of the chain according to the size of the tube. This assures a close binding of the device on the cable though the links may not in themselves come exactly right for this purpose.

The bonding members or strips $b$ are of a thin conducting material adapted to flex and bind on the cable and the solder is built upon and across the same as seen in Figs. 3 and 4.

What I claim is:

1. A soldering device for electric cables and the like comprising a plate of rectangular shape in plan and concavo-convex in cross-section from end to end, and having an oblong opening lengthwise through the same flaring inward, a flexible lining under said plate having an opening for solder corresponding in flare to the opening in said plate and chains engaged oppositely on the ends of said plate to bind the same on a cable.

2. A soldering device, substantially as described, comprising a plate of flexible material of greater length than width and concavo-convex in cross-section and having an oblong opening lengthwise through the middle thereof and a flexible lining fixed on the inside of said plate and of greater depth than the plate and provided with a corresponding opening, and link and hook connections with the plate to secure the same removably upon a tube.

3. A soldering device as described comprising a plate straight between its ends and curved transversely to conform to a cable, a flexible lining covering the inside of said plate of greater thickness than the plate and said plate and lining provided with coincident longitudinal openings at their middle adapted to receive solder, hook and link strands connected with the sides and ends of said plate and adapted to bind the same upon a cable.

In testimony whereof I affix my signature in presence of two witnesses.

PETER F. SINDELAR.

Witnesses:
R. B. MOSER,
GEO. E. KRICKER.

Copies of this patent may be obtained for five cents each, by addressing the "Commissioner of Patents, Washington, D. C."